US009026819B2

(12) United States Patent
Nguyen Tien et al.

(10) Patent No.: US 9,026,819 B2
(45) Date of Patent: May 5, 2015

(54) METHOD OF CONSERVING POWER BASED ON ELECTRONIC DEVICE'S I/O PATTERN

(71) Applicant: College of William and Mary, Williamsburg, VA (US)

(72) Inventors: Dung Nguyen Tien, Newport News, VA (US); Gang Zhou, Williamsburg, VA (US); Xin Qi, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 325 days.

(21) Appl. No.: 13/715,076

(22) Filed: Dec. 14, 2012

(65) Prior Publication Data

US 2014/0095907 A1    Apr. 3, 2014

Related U.S. Application Data

(60) Provisional application No. 61/708,261, filed on Oct. 1, 2012.

(51) Int. Cl.
*G06F 1/32*    (2006.01)
*G06F 9/50*    (2006.01)

(52) U.S. Cl.
CPC ............ *G06F 1/3203* (2013.01); *G06F 9/5061* (2013.01); *G06F 1/3209* (2013.01); *G06F 1/3253* (2013.01); *Y02B 60/1235* (2013.01)

(58) Field of Classification Search
CPC ... G06F 1/3203; G06F 9/5061; G06F 1/3209; G06F 1/3253; Y02B 60/1235
See application file for complete search history.

(56) References Cited

U.S. PATENT DOCUMENTS

| | | | |
|---|---|---|---|
| 7,996,580 B2 * | 8/2011 | Rave et al. ..................... | 710/15 |
| 8,285,340 B2 * | 10/2012 | Hackborn et al. ............ | 455/567 |
| 2009/0007128 A1 * | 1/2009 | Borghetti et al. ............ | 718/104 |
| 2012/0015695 A1 * | 1/2012 | Hackborn et al. ............ | 455/566 |
| 2012/0317568 A1 | 12/2012 | Aasheim | |

OTHER PUBLICATIONS

Pathak et al., "Where is the energy spent inside my app? Fine grained energy accounting on smartphones with Eprof", EuroSys '12 Proceedings of the 7th ACM European Conference on Computer Systems (2012), p. 29-42.
Carroll et al., "An Analysis of Power Consumption in a Smartphone", Proceedings of the 2010 USENIX Annual Technical Conference (2010), vol. 346, p. 21-21.
Malik, "Power Consumption Analysis of a Modern Smartphone", arXiv:1212.1896v2 (2013), p. 1-11.
Kim et al., "Revisiting Storage for Smartphones", ACM Transactions on Storage (2012), vol. 8, No. 4, Article 14.

\* cited by examiner

*Primary Examiner* — M Elamin
(74) *Attorney, Agent, or Firm* — Jason P. McDevitt

(57) ABSTRACT

A method of affecting power used by an electronic device is provided for an electronic device having storage media and running at least one application. Each application interfaces with the storage media through an input/output (I/O) path executing I/O activities that access the storage media in accordance with configurable parameters of the I/O path. A run-time I/O pattern defined by the I/O activities is determined during a run-time period of the electronic device. At least one of the I/O path's configurable parameters is then modified based on the run-time I/O pattern. The method is readily adapted for power conservation by providing selections for the configurable parameters with each of the selections optimizing power usage for a hypothetical I/O pattern. Then, one or more configurable parameters are modified in accordance with one of the selections for which the hypothetical I/O pattern associated therewith is closest to the run-time I/O pattern.

9 Claims, 4 Drawing Sheets

METHOD OF CONSERVING POWER BASED ON ELECTRONIC DEVICE'S I/O PATTERN

CROSS-REFERENCE TO RELATED APPLICATIONS

Pursuant to 35 U.S.C. §119, the benefit of priority from provisional application Ser. No. 61/708,261, with a filing date of Oct. 1, 2012, is claimed for this non-provisional application.

STATEMENT REGARDING FEDERALLY SPONSORED RESEARCH AND DEVELOPMENT

This invention was made with government support under Grant No. 1250180 awarded by The National Science Foundation. The government has certain rights in the invention.

FIELD OF INVENTION

The field of the invention relates generally to power conservation for electronic devices, and more particularly to a method of conserving power predicated on an electronic device's input/output (I/O) activities.

BACKGROUND OF THE INVENTION

Battery-powered devices that utilize some form of storage (e.g., cell phones, smartphones, laptop computers, pad computers, tablets, etc.) are widely used in the United States and around the world. While the capabilities of such electronic devices have advanced tremendously over the past few years, their battery lives have not advanced at the same rate. In market studies related to these types of electronic devices, insufficient battery life tops the list of user complaints. While improving battery technology is one way to address this problem, another option is to reduce power consumption.

BRIEF SUMMARY OF THE INVENTION

Accordingly, it is an object of the present invention to provide a method of reducing power consumption in electronic devices such as cell phones, smartphones, laptop computers, pad computers, tablets, etc.

Another object of the present invention is to provide a method of reducing power consumption in electronic devices that can be readily implemented on existing devices.

Still another object of the present invention is to provide a method of reducing power consumption in electronic devices that can operate in the background of such electronic devices without requiring any involvement by the device's user.

Yet another object of the present invention is to provide an efficient method of reducing power consumption in electronic devices.

In accordance with the present invention, a method of affecting power used by an electronic device is provided for an electronic device having storage media and running at least one application. Each application interfaces with the storage media through an input/output (I/O) path executing I/O activities that access the storage media in accordance with a plurality of configurable parameters of the I/O path. A run-time I/O pattern defined by the I/O activities is determined during a run-time period of the electronic device. At least one of the configurable parameters is then modified based on the run-time I/O pattern to thereby affect power used by the electronic device to execute the I/O activities. When power conservation is the goal, a plurality of selections for the configurable parameters are provided with each of the selections optimizing power usage for a hypothetical I/O pattern. Then, at least one of the configurable parameters is modified in accordance with one of the selections for which the hypothetical I/O pattern associated therewith is closest to the run-time I/O pattern.

BRIEF DESCRIPTION OF THE DRAWINGS

The summary above, and the following detailed description, will be better understood in view of the drawings that depict details of preferred embodiments.

DETAILED DESCRIPTION OF THE INVENTION

The present invention is a method of conserving power in electronic devices to include cell phones, smartphones, laptop computers, pad computers, tablets, etc. In general, the present invention can be used to conserve power for any electronic device that includes storage media and that includes an "input/output" (I/O) path controlling a variety of I/O activities that access the storage media. Accordingly, the term "electronic device" as used herein will refer to devices so-equipped and configured. Practically, the present invention will find its greatest utility in battery-powered electronic devices since it will extend the life of a battery's charge. However, it is to be understood that the present invention's ability to conserve power is not limited to electronic devices powered by batteries. The term "storage media" as used herein refers to any type of non-volatile or volatile data memory.

Figure 1:
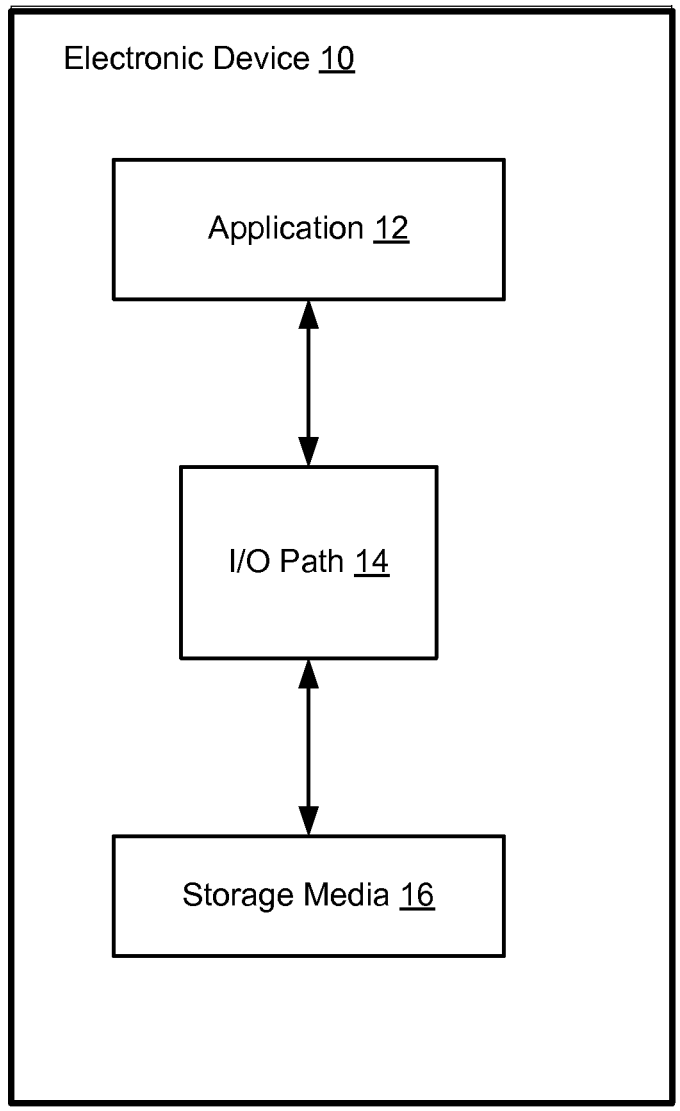
FIG. 1 is a top-level block diagram of an electronic device illustrating several components thereof in accordance with the prior art.

Prior to explaining the present invention, reference will be made to FIG. 1 where a conventional electronic device 10 illustrates three top-level components involved in implementation of the present invention's method. One or more applications 12 installed on electronic device 10 request access to storage media 16 (that generally includes some type of non-volatile memory) provided on or coupled to electronic device 10 where such requests go through an I/O path 14 on electronic device 10. The types of applications 12, I/O path 14, and storage media 16 are not limitations of the present invention, as they will vary for different types of electronic devices 10. Examples will be provided throughout the description.

In general, I/O path 14 is a set of hardware and software components that control and execute a variety of I/O activities that originate at application(s) 12 and require access to storage media 16. The I/O activities include reads of storage media 16 and writes thereto. Additional I/O activities include updates and merges, and can include more specialized actions such as, but not limited to, the following:

I/O was remapped to a different device
I/O bounced
I/O completion
I/O issued to driver
I/O front merged with request on queue
Get request
I/O inserted on request queue
I/O back merged with request on queue
Plug request
I/O handled by request queue code
Sleep request
Unplug due to timeout
Unplug request
Split During design of an electronic device, an I/O path 14 is configured with parameters that will execute the expected I/O activities in a way that is deemed appropriate. This is known as the default configuration of I/O path 14. However, research has shown that default configurations of an I/O path are not always optimal in terms of power usage. That is, power usage efficiency of I/O path 14 can vary substantially from application to application as corresponding I/O activities vary. This leads to user dissatisfaction with battery life as well as inconsistent battery life results from user-to-user of the same type of electronic device 10 since different users rely on different applications 12.

Figure 2:
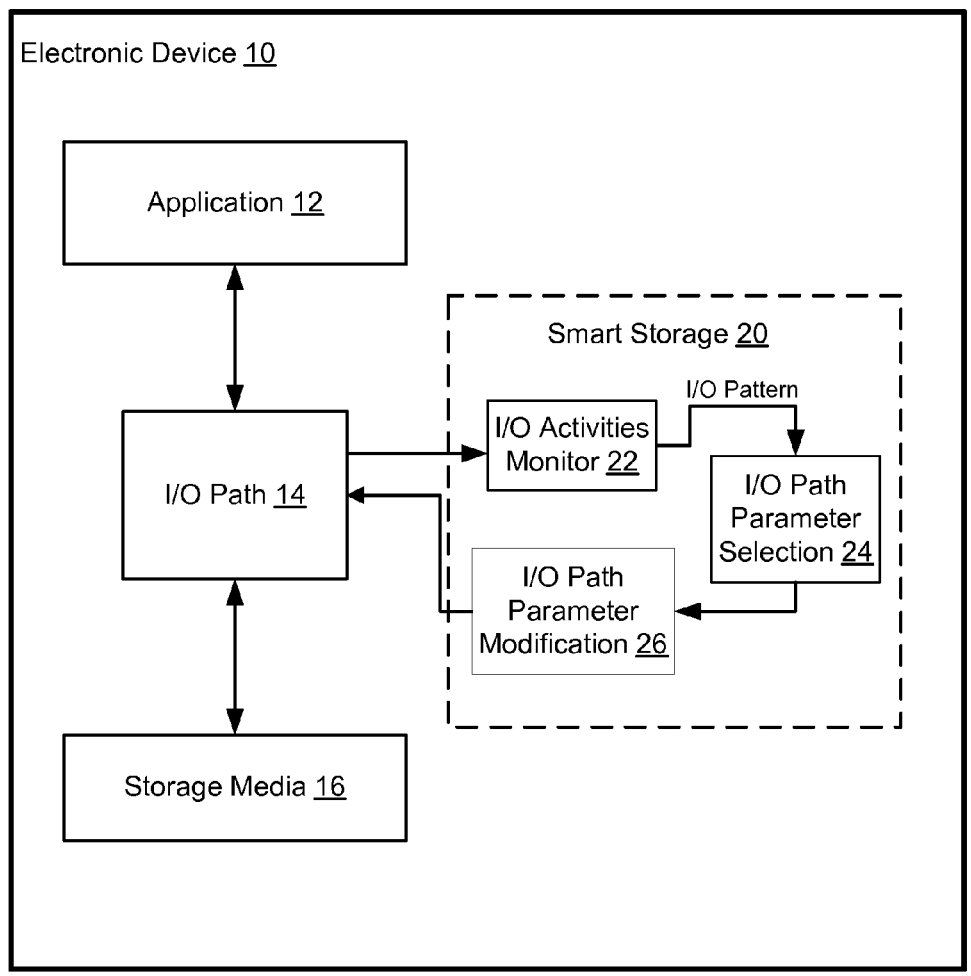
FIG. 2 is a top-level block diagram of an electronic device configured for conserving power based on the "input/output" (I/O) pattern of activities going through the electronic device's I/O path in accordance with an embodiment of the present invention.

Referring now to FIG. 2, a block diagram of electronic device 10 configured to conserve power in accordance with an embodiment of the present invention is shown. Briefly, one or more of the parameters of I/O path 14 are modified by a smart storage system 20 based on I/O activities executed by I/O path 14. System 20 includes an I/O activities monitor 22 that monitors the various I/O activities on I/O path 14 during some run-time period (i.e., when I/O path 14 is operating) of electronics device 10. The length of the run-time period used by monitor 22 can be on the order of seconds, minutes, etc., and can be fixed, user adjustable, or adaptable. In terms of a run-time period that is adaptable, monitor 22 could start at or default to a period of (for example) one minute and then increase/decrease the time (e.g., incrementally, exponentially, etc.) until changes in I/O activities are detected. An adaptive algorithm could also be used to adjust the run-time period used by monitor 22. Run-time period adjustments could also be triggered by event(s) occurring at the application layer, the system layer, or any other source.

Regardless of the length of the run-time period used, such monitoring of I/O activities will generally occur on some type of intermittent basis in order to minimize power requirements associated with implementation of the present invention. The term "intermittent" as used herein includes periodic execution of processes carried out by monitor 22, random execution of processes carried out by monitor 22, event triggering of process carried out by monitor 22 (e.g., the n-th execution of a particular application in some time period, simultaneous running of certain applications, etc.), or any other criteria that determines the non-continuous execution of processes carried out by monitor 22.

I/O activities monitor 22 monitors "traffic" on I/O path 14 for a run-time period and outputs an I/O pattern indicated by the I/O activities. Examples of such monitoring utilities include Linux-based block I/O layer tracing utility "blktrace" (see linux.die.net/man/8/blktrace) as well as other Linux-based tracing utilities "strace" (see http://sourceforge.net/projects/strace) and "Itrace" (see http//en.wikipedia.org/wiki/Ltrace). A tracing utility that can used with BSD Unix or Mac OS X operating systems is "ktrace" (see http://en.wikipedia.org/wiki/Ktrace). Monitor 22 can employ one or more tracing utilities without departing from the scope of the present invention. The information included in an I/O pattern can vary depending on the type of electronic device 10. For example, monitor 22 could track process identifications of each I/O, the type of I/O such as a read, write, update, merge, etc., a time stamp of the I/O, sequence number, etc. Monitor 22 then uses the raw/tracked information to output an I/O pattern indicative of the tracked information. The I/O pattern is provided to an I/O path parameter selection module 24.

As mentioned above, I/O path 14 is configured with a variety of parameters that determine the efficiency and, therefore, the power consumption associated with the I/O activities accessing storage media 16. In general, parameter selection module 24 stores a number of sets of parameters that can be used by an I/O path parameter modification module 26 to modify or reconfigure one or more parameters governing operation of I/O path 14. As a result, the power used by electronics device 10 with its reconfigured I/O path 14 will be affected. More specifically, selection module 24 stores sets of I/O path parameters and corresponding "hypothetical" (e.g., empirically determined) I/O patterns that would be generated if the corresponding set of I/O path parameters were used to configure I/O path 14. For purpose of the present invention, selection module 24 provides sets of parameters with corresponding hypothetical I/O patterns that are optimized in terms of power usage. It is to be understood that a set of parameters can define a single parameter (e.g., one of a device driver's queue depth, the scheduling algorithm employed by an I/O path, cache policy, etc.) or combinations of parameters.

Selection module 24 compares the run-time I/O pattern from monitor 22 with the hypothetical I/O patterns stored by selection module 24 with the closest match therebetween indicating a set of parameters that will yield optimized power usage for the current run-time I/O activities. The "closest match" set of parameters are provided to modification module 26 to thereby configure I/O path 14 for optimized power usage based on the run-time I/O pattern.

Figure 3:
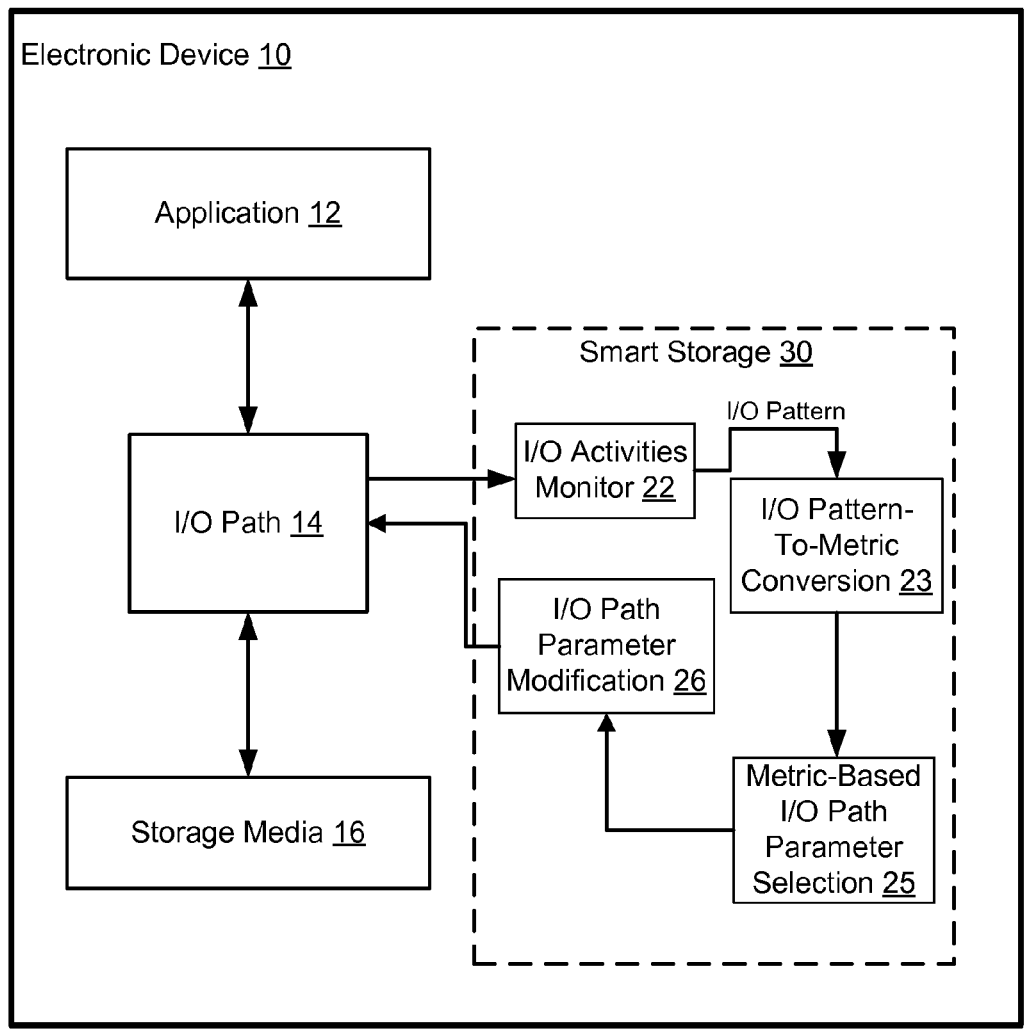
FIG. 3 is a top-level block diagram of an electronic device configured for conserving power based on a metric of the I/O pattern of activities in accordance with another embodiment of the present invention.

Since the present invention adds (albeit intermittently) a run-time activity to electronics device 10, it is desirable to make the present invention computationally simple to minimize its power usage. One way to do this is to eliminate analysis of the raw/tracked information collected by monitor 22 by assigning a numeric metric thereto and using that same numeric metric definition for the hypothetical I/O patterns maintained at selection module 24. Accordingly, FIG. 3 illustrates another embodiment of the present invention where a smart storage system 30 also includes a metric converter module 23 that converts the raw I/O pattern information into a simple run-time metric. A metric-based I/O path parameter selection module 25 is analogous to selection module 24 in that it stores the above-described sets of parameters for optimized power usage. However, in this embodiment, selection module 25 associates each set of parameters with a metric defined in the same fashion as the run-time metric. In this way, selection module 25 executes its parameter selection task via a computationally simple numeric metric comparison and search for a closest match. The selected set of parameters identified by the closest match is supplied to modification module 26.

It is to be understood that a variety of metric definitions could be utilized without departing from the scope of the present invention. One simple metric is a ratio between the number of reads completed per some time interval (e.g., one or several seconds) and the number of writes completed during the same time interval. Other exemplary metrics could be based on numbers of updates, merges, etc., completed for some time interval. Still other metrics could be based on numbers of random reads/writes or number of sequential reads/writes.

Figure 4:
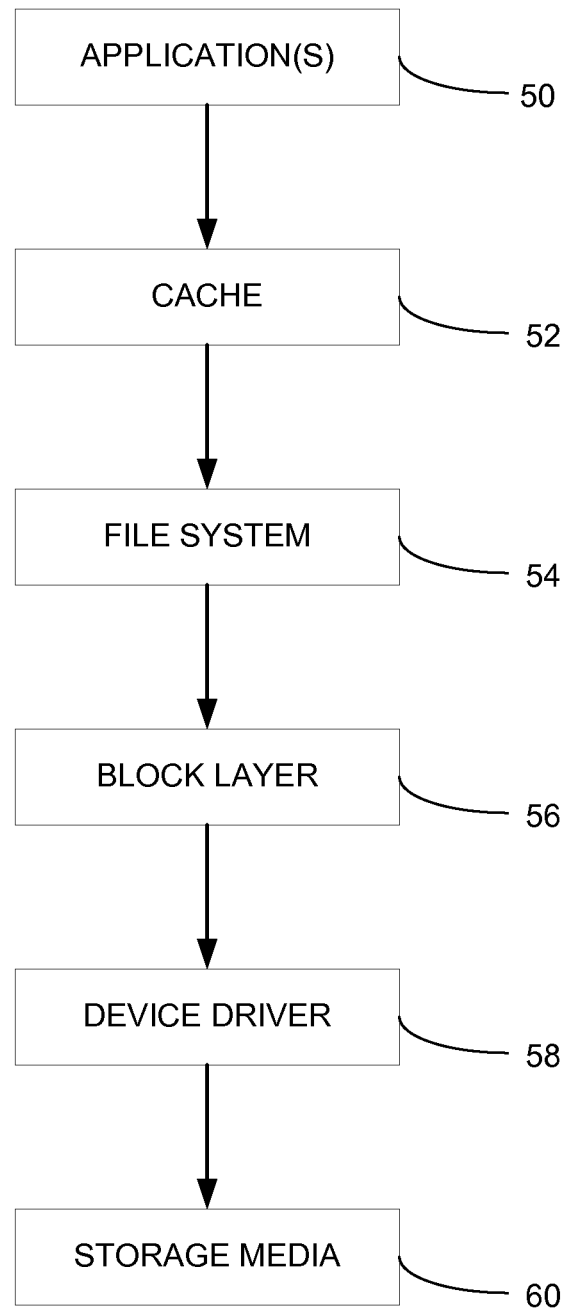
FIG. 4 depicts the I/O path of an Android-based smartphone that can benefit from use of the present invention.

By way of an illustrative example, the present invention will be explained for its use with a smartphone running on the Android platform. Specifically, the tested smartphone was the Google Nexus One having the Android version 2.3.7, baseband version 32.41.00.32U_5.08.00.04, Kernel version 2.6.37.6-cyanogenmod-g0799e00android@ portatile #1. Referring now to FIG. 4, the I/O path between Android-based application(s) 50 and its storage media 60 (e.g., internal NAND flash memory, an external SD card, and some limited amount of RAM) is illustrated. The components in the I/O path defined between application(s) 50 and storage media 60 are a particular example of the generalized I/O path 14 described above. A brief description of these components and their configurable parameters affecting power usage will be presented below.

A cache (memory) 52 provides a limited amount of temporary storage for quick/efficient I/O request handling as is well known in the art. The policy governing cache 52 can affect the power used to carry out the I/O activities along the I/O path. Two well-known caching policies are "write back" and "write through". Write-back is the default approach used in smartphones which in practice means that the device signals I/O completion to the operating system before data has hit the flash disk. In contrast, a write-through cache performs all write operations in parallel with data written to the cache and the disk simultaneously.

A file system 54 defines the various file types used. There are several system types used by smartphone vendors. Each flash partition can be formatted in a different file system type before being properly mounted to given namespaces such as /data, /system, or /cache. Most frequently used file systems are YAFFS2, ext2, ext3, and ext4. YAFFS2 is used, for instance, in HTC Hero or Google Nexus One. Ext4 is employed in the most recent Android smartphones such as Samsung Galaxy or Samsung Nexus S.

A block layer 56 has the primary function of scheduling I/O requests from application(s) 50 and sending them down to the device driver. The Linux kernels on Android smartphones offer 4 scheduling algorithms: BFQ, CFQ, Deadline, and Noop. In BFQ (Budget Fair Queuing), each process is assigned a fraction of disk (budget) measured in number of sectors and the disk is granted to a process until the budget expires. CFQ (Complete Fair Queuing) attempts to distribute available I/O bandwidth equally among all I/O requests. The requests are placed into per-process queues where each of the queues gets a time slice allocated thereto. The Deadline algorithm attempts to guarantee a start time for a process. The queues are sorted by expiration time of processes. Noop inserts incoming I/Os into a FIFO fashion queue and implements request merging. In some Android phones, the default fixed scheduling algorithm is BFQ (Google Nexus One), while others use CFQ (Samsung Galaxy Nexus, Samsung Nexus S).

A device driver 58 gets requests from block layer 56 and does whatever is needed to process them before sending back a notification to block layer 56. The parameter of interest for device driver 58 is known as queue depth which is defined as the number of pending I/O requests for storage. The queue depth is fixed to different values depending on vendors, usually 128 (e.g., Samsung Galaxy Nexus or Google Nexus One), but could be set to other depth values (e.g., 4, 8, 16, 32 or 64).

In order to develop the hypothetical I/O patterns/metrics used in the present invention, the smartphone was operated under a variety of I/O activity parameter configurations with the corresponding energy consumption of the various configurations measured by a number of known benchmark routines. The number and type of benchmark routines used to develop the hypothetical I/O patterns/metrics used by the present invention is not a limitation thereof. In testing of this exemplary smartphone application of the present invention, eight of the most popular benchmarks for testing smartphone performance were used. These eight benchmarks and their internet sources are identified below in Table 1.

TABLE 1

| BENCHMARK | PROPERTIES | SOURCE |
| --- | --- | --- |
| AuTuTu | All-in-one: CPU, GPU, memory and storage | http://www.antutu.com |
| CF-Bench | All-in-one: CPU, memory, storage, and Java code performance | https://play.google.com/store/apps/details?id=eu.chainfire.cfbench |
| GLBenchmark | GPU | http://www.glbenchmark.com |
| BrowserMark | JavaScript and HTML rendering performance | http://browsermark.rightware.com |
| AndroBench | Detailed storage performance Sequential (random) read and write in MB/s SQLite insert, update and delete in TPS | http://www.androbench.org |
| Quandrant | CPU, memory, I/O, 2D and 3D | http://www.aurorasoftworks.com/products/quadrant |

TABLE 1-continued

| BENCHMARK | PROPERTIES | SOURCE |
|---|---|---|
| Smartbench | All-in-one: multi-core friendly | https://play.google.com/store/apps/details?id=com.smartbench.twelve |
| Vellamo | Browser performance Networking, rendering and user experience. | http://www.quicinc.com/vellamo |

As mentioned above, one or more parameters of the I/O path can have an impact on power usage for a particular pattern of I/O activities. In the illustrated Android-based smartphone using the identified benchmark routines, it was found that the combination of the type of I/O scheduling algorithm and device driver queue depth had the greatest effect on power usage. However, other types of devices and/or benchmark routines could yield different results without departing from the scope of the present invention. The selected metric used in the tested example was a ratio proportion ("RP") defined as the number of completed reads per second divided by the number of completed writes per second. Note that this type of metric characterizes the I/O's of the whole smartphone to include those originating from background services. Therefore, this approach is not dependent on the particular application being run. The resulting (hypothetical) RP metrics along with the corresponding parameter configuration (i.e., in terms of the I/O scheduling algorithm type and device driver queue depth in the illustrated example) for optimized power usage are shown in Table 2 below. The RP metrics are the values compared to the run-time metric in order to determine the above-described closest match. The Energy Savings column refers to the amount of power saved for the optimal configuration as compared to the smartphone's default configuration which was BFQ/128 for the tested smartphone. It is clear from Table 2 that there are a number of I/O pattern scenarios that could save power by implementing a change in I/O path parameter configuration.

TABLE 2

| BENCHMARK | RP | OPTIMAL CONFIGURATION (Scheduling/Queue Depth) | ENERGY SAVINGS |
|---|---|---|---|
| AuTuTu | 0.79 | Deadline/4 | 40% |
| CF-Bench | 0 | CFQ/4 | 27.27% |
| GLBenchmark | 4.96 | Deadline/4 | 27.27% |
| BrowserMark | 1.61 | CFQ/4 | 28.57% |
| AndroBench | 21.77 | Noop/128 | 31.58% |
| Quadrant | 0.75 | BFQ/4 | 42.86% |
| Smartbench | 13 | BFQ/128 | 0 |
| Vellamo | 9 | BFQ/128 | 0 |

The advantages of the present invention are numerous. By modifying/adapting parameters of an I/O path of an electronic device based on a user's current I/O activities, the present invention can be used to conserve power used during the device's storage operations in accordance with how the user is actually using the device. The present invention could be readily installed on existing devices and run as a background service to conserve power without interruption and/or any user interaction. The power savings approach presented herein can be used to extend the battery life of a wide variety of electronic devices used in today's communication and computing environments. Since the present invention need only be used on intermittent basis, its energy needs will be relatively small. Further, when implemented using the described metric-based approach, the present invention's energy requirements are further reduced.

The present invention can be readily incorporated into new electronic devices and, therefore, be sold in combination therewith by hardware wholesalers and retailers. However, the present invention could also be downloaded by an electronic device's user. That is, the present invention could also be offered for sale to existing hardware owners by software/applications retailers.

While the present invention is described for the modification of I/O path parameters, it is not so limited. For example, if an electronic device's storage media were similarly defined by configurable parameters, the methods described herein could be readily extended to modify the parameters of the storage media to affect power usage. This is especially true for I/O path definitions that include a device's storage media.

Incorporation by Reference

All publications, patents, and patent applications cited herein are hereby expressly incorporated by reference in their entirety and for all purposes to the same extent as if each was so individually denoted.

Equivalents

While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

We claim:

1. A method of affecting power used by an electronic device, comprising the steps of:
providing an electronic device having storage media and running at least one application, wherein each said application interfaces with said storage media through an input/output (I/O) path executing I/O activities accessing said storage media in accordance with a plurality of configurable parameters of said I/O path;
determining a run-time I/O pattern defined by said I/O activities during a run-time period of the electronic device; and
modifying at least one of said configurable parameters based on said run-time I/O pattern to thereby affect power used by the electronic device to execute said I/O activities,
wherein said step of modifying comprises the steps of:
providing a plurality of selections for said configurable parameters, each of said selections optimizing power usage for a hypothetical I/O pattern; and
modifying at least one of said configurable parameters in accordance with one of said selections for which said hypothetical I/O pattern associated therewith is closest to said run-time I/O pattern.

2. A method of affecting power used by an electronic device, comprising the steps of:
providing an electronic device having storage media and running at least one application, wherein each said application interfaces with said storage media through an input/output (I/O) path executing I/O activities accessing said storage media in accordance with a plurality of configurable parameters of said I/O path;
determining a run-time I/O pattern defined by said I/O activities during a run-time period of the electronic device; and
modifying at least one of said configurable parameters based on said run-time I/O pattern to thereby affect power used by the electronic device to execute said I/O activities,
wherein said step of modifying comprises the steps of:
providing a plurality of selections for said configurable parameters, each of said selections optimizing power usage for a hypothetical I/O pattern, each of said selections having a benchmark metric associated therewith indicative of said hypothetical I/O pattern;
converting said run-time I/O pattern to a run-time metric defined in correspondence with said benchmark metric; and
modifying at least one of said configurable parameters in accordance with one of said selections for which said benchmark metric is closest to said run-time metric.

3. A method according to claim 2, wherein said I/O activities include I/O reads and I/O writes, and wherein said run-time metric is defined as a ratio between a number of said I/O reads completed in a time interval and a number of said I/O writes completed in said time interval.

4. A method of affecting power used by an electronic device, comprising the steps of:
providing an electronic device having storage media and running at least one application, wherein each said application interfaces with said storage media through an input/output (I/O) path executing I/O reads and I/O writes to said storage media in accordance with a plurality of configurable parameters of said I/O path;
determining a run-time I/O pattern defined by said I/O reads and said I/O writes during a run-time period of the electronic device; and
modifying at least one of said configurable parameters based on said run-time I/O pattern to thereby affect power used by the electronic device to execute said I/O reads and said I/O writes,
wherein said step of modifying comprises the steps of:
providing a plurality of selections for said configurable parameters, each of said selections optimizing power usage for a hypothetical I/O pattern; and
modifying at least one of said configurable parameters in accordance with one of said selections for which said hypothetical I/O pattern associated therewith is closest to said run-time I/O pattern.

5. A method of affecting power used by an electronic device, comprising the steps of:
providing an electronic device having storage media and running at least one application, wherein each said application interfaces with said storage media through an input/output (I/O) path executing I/O reads and I/O writes to said storage media in accordance with a plurality of configurable parameters of said I/O path;
determining a run-time I/O pattern defined by said I/O reads and said I/O writes during a run-time period of the electronic device; and
modifying at least one of said configurable parameters based on said run-time I/O pattern to thereby affect power used by the electronic device to execute said I/O reads and said I/O writes,
wherein said step of modifying comprises the steps of:
providing a plurality of selections for said configurable parameters, each of said selections optimizing power usage for a hypothetical I/O pattern, each of said selections having a benchmark metric associated therewith indicative of said hypothetical I/O pattern;
converting said run-time I/O pattern to a run-time metric defined in correspondence with said benchmark metric; and
modifying at least one of said configurable parameters in accordance with one of said selections for which said benchmark metric is closest to said run-time metric.

6. A method according to claim 5, wherein said run-time metric is defined as a ratio between a number of said I/O reads completed in a time interval and a number of said I/O writes completed in said time interval.

7. A method of affecting power used by an electronic device, comprising the steps of:
providing a battery-powered electronic device having storage media running at least one application, wherein each said application interfaces with said storage media through an input/output (I/O) path executing I/O activities accessing said storage media in accordance with a plurality of configurable parameters of said I/O path;
determining a run-time I/O pattern defined by said I/O activities during a run-time period of the electronic device;
comparing said run-time I/O pattern to a plurality of hypothetical I/O patterns to determine a closest match therebetween, each of said hypothetical I/O patterns being indicative of a set of said configurable parameters that optimize power used by the electronic device; and
reconfiguring at least one of said configurable parameters of said I/O path in accordance with said set of said configurable parameters associated with one of said hypothetical I/O patterns specified by said closest match,
wherein said step of comparing comprises the steps of:
converting each of said hypothetical I/O patterns to a benchmark metric associated therewith;
converting said run-time I/O pattern to a run-time metric defined in correspondence with said benchmark metric; and
comparing said run-time metric to each said benchmark metric in order to determine said closest match.

8. A method according to claim 7, wherein said I/O activities include I/O reads and I/O writes, and wherein said run-time metric is defined as a ratio between a number of said I/O reads completed in a time interval and a number of said I/O writes completed in said time interval.

9. A method of affecting power used by an electronic device, comprising the steps of:
running at least one application on an electronic device having storage media, wherein each said application interfaces with said storage media through an input/output (I/O) path executing I/O activities accessing said storage media in accordance with a plurality of configurable parameters of said I/O path;
determining a run-time I/O pattern defined by said I/O activities during a run-time period of the electronic device; and modifying at least one of said configurable parameters based on said run-time I/O pattern to thereby affect power used by the electronic device to execute said I/O activities,
wherein said step of modifying comprises the steps of:
providing a plurality of selections for said configurable parameters, each of said selections optimizing power usage for a hypothetical I/O pattern; and
modifying at least one of said configurable parameters in accordance with one of said selections for which said hypothetical I/O pattern associated therewith is closest to said run-time I/O pattern.

\* \* \* \* \*